United States Patent [19]

Mayolo

[11] Patent Number: 5,228,626
[45] Date of Patent: Jul. 20, 1993

[54] MOVABLE INDUSTRIAL PLANT TO DRY INTO POWDER DIFFERENT LIQUIDS

[76] Inventor: Daniel A. Mayolo, 5940 Las Varillas, Cordoba, Argentina

[21] Appl. No.: 865,316

[22] Filed: Apr. 9, 1992

[51] Int. Cl.$^5$ .............................................. B02C 19/12
[52] U.S. Cl. ................................ 241/65; 241/79.1; 241/101.7
[58] Field of Search ................. 241/3, 101.7, 65, 79.1

[56] References Cited

U.S. PATENT DOCUMENTS

| | | | |
|---|---|---|---|
| 2,205,177 | 6/1940 | Schlegel et al. | 241/3 |
| 2,397,363 | 3/1946 | McLeod | 241/101.7 |
| 3,880,360 | 4/1975 | Peng et al. | 241/3 |
| 4,287,708 | 9/1981 | Neely, Jr. | 56/13.5 |
| 5,167,372 | 12/1992 | Poggie et al. | 241/23 |

Primary Examiner—Mark Rosenbaum
Assistant Examiner—John M. Husar
Attorney, Agent, or Firm—Harrison & Egbert

[57] ABSTRACT

A mobile industrial plant for drying different organic liquids into powders having a chassis with wheels connected thereto, a low temperature evaporator mounted on the chassis for evaporating liquid substances therein, a steam condenser connected to and interactive with the evaporator so as to condense the evaporated liquid, a vacuum pump interconnected to the steam condenser for causing a vacuum within the condenser, a pulverizing drier mounted on the chassis in a position so as to receive a concentrated liquid substance from the evaporator, an air-heater mounted on the chassis and connected to the evaporator and to the pulverizing drier so as to supply heat thereto, a separator-filter connected to the pulverizing drier for drawing out hot humid air and filtering particles, a hot-air separator mounted on the chassis and connected to the pulverizing drier and the air-heater, and an engine connected in driving relationship to the evaporator, the steam condenser, the vacuum pump, the pulverizing drier, to the air-heater, and to the separator-filter.

13 Claims, 2 Drawing Sheets

MOVABLE INDUSTRIAL PLANT TO DRY INTO POWDER DIFFERENT LIQUIDS

TECHNICAL FIELD

This invention makes reference to a series of machines and elements that are assembled on a transportable chassis for its displacement. Its objective is to dry into powder several substances. The invention consists of an evaporator, one pulverization drier, motive power, centrifugate separator of small particles, collector cylinder, boiler, etc.

BACKGROUND ART

The traditional methods that nowdays work successfully, are well known. These methods, are the ones that provide us (consumers) with powdered milk, powdered blood, and plasma, powdered eggs, powdered soluble coffee, powder soap, powdered fruit juice, etc.

The system these industries use carry the different liquids, in the best possible ways, to the place where special machines will transform them into powder.

EXAMPLE

To obtain dried milk, as a first step, we have to collect the milk from the farm. This is done by special trucks which take it to storing plants where it is kept until pasteurization. After that, it is cooled. Milk is then taken in big special trucks to the drying plants which normally process great volumes.

A similar process takes place with other liquids of easy decomposition. This process has an objective, i.e. the preservation of the liquids in the best possible way. So that after the reconstitution of the mentioned powders, the liquid would be very similar to the original liquid.

The invention has the purpose of obtaining a product of excellent bacteriological quality, and of allowing the development of new areas for dairy products, citric ones, etc. It also has as purpose, the utilization of wasted substances since the drying into powder is a costly and troublesome process. It is necessary to consider that the greatest expenses produced are based on a liquid that will not be of any use and will then be evaporated in the drying plants (80-90%) . . . "An industry on wheels, saves the movement of vehicles on wheels to that industry."

SUMMARY OF THE INVENTION

The advantages offered by the invention, are mainly the following ones:

In the milk industry, the advantages are found in the quality, since in drying the recently obtained milk of the cow, there is no contamination, what's more, during the process previous to the drying into powder, it is pasteurized.

This is so, because the transportable industrial plant to dry into powder different liquids starts to work with the milking of the first cow and ends with the milking of the last one, that is to say the milk obtained from the cows is stored in a bag that contains the powder obtained during the milking process.

In economic terms, the advantages are considerable since only one person can take care of this movable industry, a conventional pick up can transport it, and on rainy days, this can be done by an ordinary tractor. In this way, all the operative expenses are reduced to zero.

This machine is easy to adapt to the fruit-horticultural industry, because it can be taken to the place where the plantation is located, since it has space, motive power, a citric squeezer and other machines can be applied to it.

As the transportable plant has the required measures to move in the cities, it can dry into powder, liquids that otherwise would contaminate rivers, streams and lakes. These contaminating liquids can be transformed into useful substances of commercial value. For example sewer waste, blood, and slaughter house waste.

An industry of this kind, allows dairy exploitations, in areas of difficult access, since this type of exploitations always requires a nearby industry, this is also true for other exploitations.

One of the ways to carry out the invention is described in detail further on. The drawings are only for illustration.

DETAILED DESCRIPTION OF THE INVENTION

Figure 1:
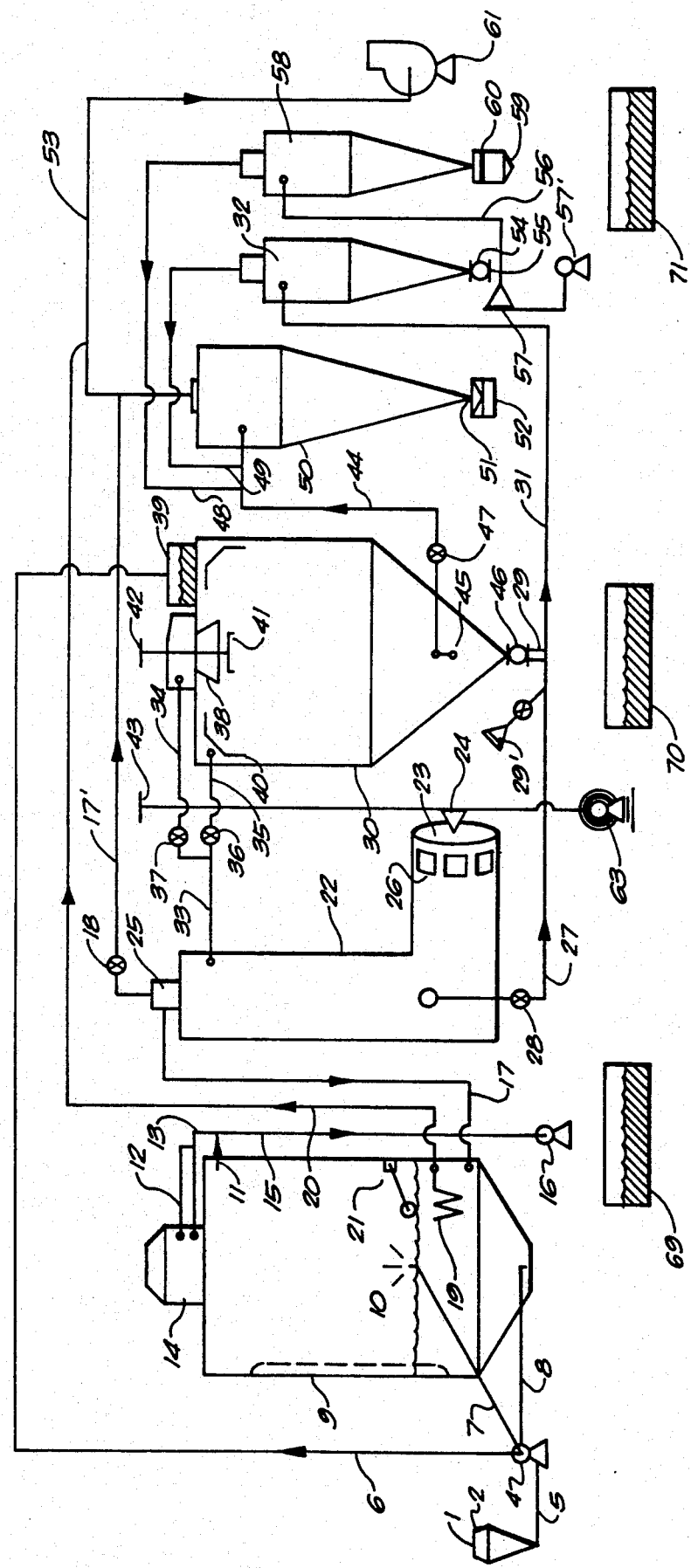
FIG. 1 is an explanatory scheme of one of the different ways of carrying out this invention.
Figure 2:
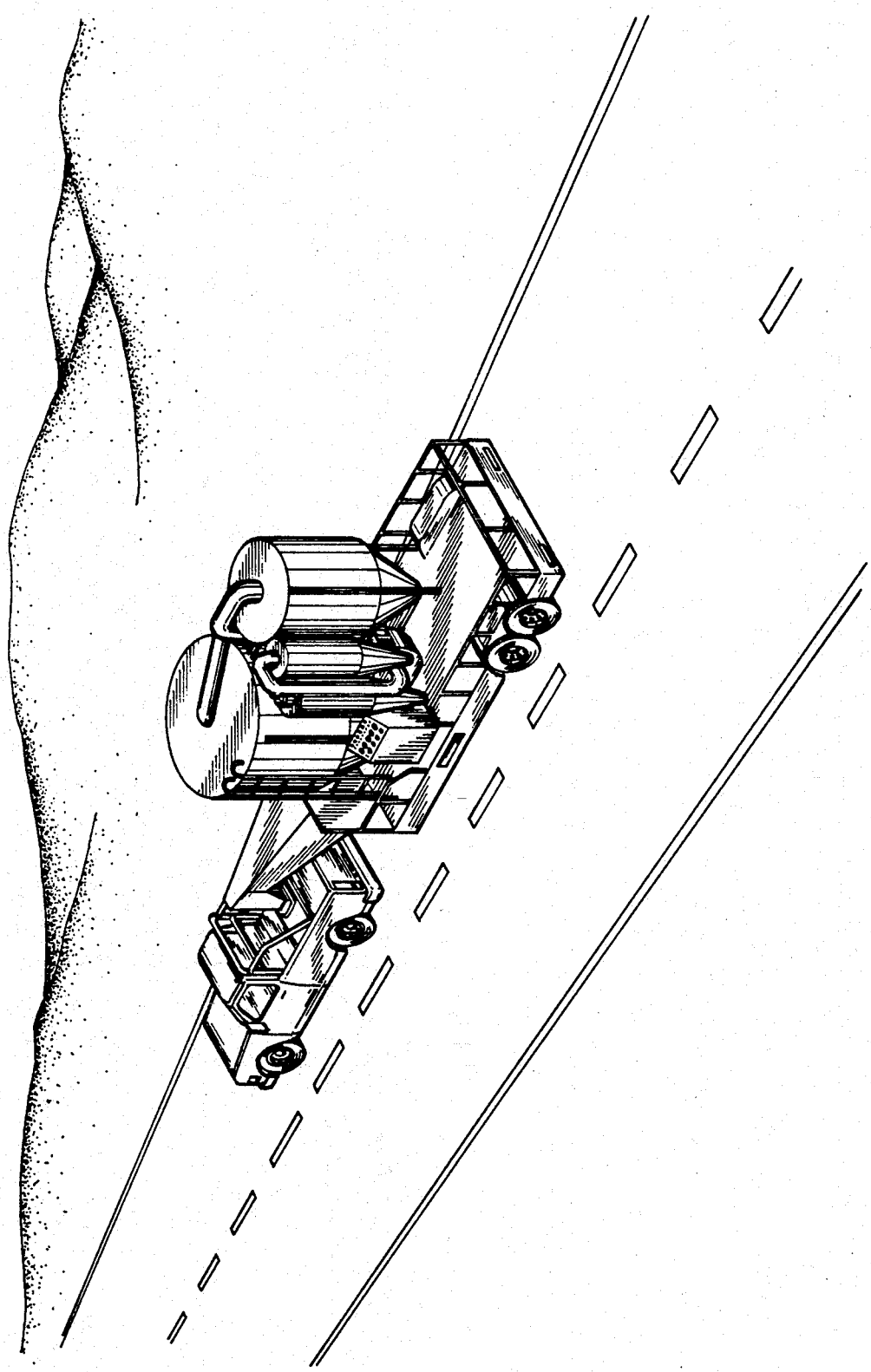
FIG. 2 is a view with the purpose of showing the arrangement of the whole unit of elements that make up the transportable industrial plant.

In FIG. 1, marked with number 1, which indicates the entrance of the liquid to the container (3) through the filter (2); then through the pipe (5) where the liquid is aspirated by the centrifugal pump (4), which is operated by the engine (63) to drive the liquid through the pipe (7) that ends in an element that pulverizes upwards, in small drops that then, will come down up to a certain level (21) within the evaporator of low temperatures (9). Once this level has been reached, the float which is place in the inner part of the evaporator (9) closes the electro-valve which is placed in the pipe (5) and it opens the electro-valve which is in the pipe (8), consequently, a recycling of the liquids occurs within the evaporator in a place which has temperature produced by the radiant (19). This radiant is reached by all the wasted gases that come from the boiler (22) which sucks air to produce the burning process (23) and then, goes to the burner (24) through the tube (17). This air comes out from the chimney (25) whose valve (18) which is placed in the tube (17) regulates the temperature. Then these gases are aspirated by tube (20) which is leaned to the aspiration central tube (53) to be expelled to the outside through the exhaust fan (61) which is propelled by the motor (63),—that is according to the temperature required by the evaporator (9)

The steam produced in this environment is condensed in large radiators of large contact surface (14). The above mentioned radiators (14) which have to condense the steam produce by the vacuum pump (16) which is moved by the motor (63) through the pipes (12), (13) and (11) which will drive the vacuum to the inside of the evaporator (9) and through the pipes, the condensed steam will be expelled. Once 50% of the liquid has been evaporated (or the rate that a person wishes to adjust), the level float (21) will warn the electro-valve located in the pipe, (6) to start opening to give way to the concentrate into the store, (39) located on the top part of the pulverization drier (30).

This is either a continuous or discontinuous process that depends on the adjustment of the electro-valves by means of the level float which is the one that controls them at will.

After the concentrate has been obtained, we are ready to work with the pulverization drier (30) to obtain a greater yeild of the liquid to be dried.

Pulverization drier (30): It consists of a big and large diameter cylinder, tubes are arranged in the top part where the drying agent (hot air) enters a container in which the liquid to be dried is poured in a structure that holds up and operates the rotor, which will pulverize in small drops of equal diameter.

These small drops will boil at suspension till the liquid is consumed in fractions of seconds due to the drier agent which makes them rotate so as to remain the required time, till the whole or partial drying is completed. These small drops partially or totally dried will be stores in a cone, due to the effect of gravity, as powder, somehow humid according to the period of exposure, the size of the drop, the temperature of the drier agent, factors which are controlled at will.

All that can be achieved thanks to the impulse of the engine (63) which drives the pulley (43) which by means of belts increase the speed of the pulley (42), which in turn moves the rotor (41) which will transform the liquid that remains in the store (39) into an homgeneous rain, which will be dried out by the effect of the hot air. That hot air necessary to dry these microdrops in suspension is previously heated in the boiler (22) and through tube (35) and (34) goes to the central distributor (38) and to the peripheric distributor (40), corresponding to the valves (37) and (36). The whole air volume is aspirated by a tube of big diameter (44) which ends into an aspiration inlet (45); this hot air loaded with humidity that comes from the drops being evaporated, is driven by a great aspiration to the centrifufal separator of small particles (50) to the store, then in a container (52) through a valve (51) the wet powder that—in in a special case—would remain in suspension within the drier (30).

All of the gas volumes, (clean gases and waste ones) that circulate in this system, are aspirated by the exhaust fan (61), as can be observed in the diagram which appears in FIG. 1.

The powder produced and stored in the pulverization drier cone (30) is collected by the rotative valve (46) which pours the powder into the turbulence duct (29). Then it is aspirated by the pneumatic duct of transport (31), which will take the powder to the centrifugal separator of small particles (32). This transport will be carried out with cool air, or with hot air depending on what is required. A second drying can be obtained operating the valve (28) which is located in the duct (27), that is, that powder humidity is adjustable at will, otherwise, the environmental air for transport can be sucked.

To obtain the necessary force to carry out this heavy transport, the aspiration valve (47) which is in the tube (44) must be closed so as to drive all the aspiration by the duct (49) until it reaches the centrifugal separator (32) and then it passes through the pneumatic conduct (31). Once the valve is closed (47) the drier has no aspiration (30). For this reason the drying process is not performed during collecting time. All this happens because we have been working in a limited required space with the fewest elements to achieve an aim. In practical terms everything is completely simple and easy to perform.

Once the powder has been obtained in the centrifugal separator (32) by the rotative valve (54). The powder can be packed or it can be stored for its subsequent packing (59) that by means of the flat valve (60) is collected from the centrifugal separator (58), this second separator has the particularity of cooling the powder at low temperatures, due to the cold produced by radiants during the aspiration process (57) that by means of a cooling equipment produce the required low temperatures to treat those powders that are fat free on its surface.

In FIG. 1, it is possible to see the boiler fuel tanks (70); those of the engine (69) and the liquids to be processed (71). In practical terms, these are located in the lower part of the chassis floor, that is, they are invisible at first sight, and these tanks, increase the weight, lowering the center of gravity, due to its arrangement, and increasing the stability.

I claim:

1. A mobile industrial plant to dry different organic liquids into powders comprising:

a chassis having wheels connected thereto for mobility;

a low-temperature evaporator means mounted on said chassis, said evaporator means for evaporating liquid substances therein, said evaporator means having a container for receiving and storing the liquid substances;

a steam condenser means connected to and interactive with said evaporator means so as to condense the evaporated liquid;

a vacuum pump means interconnected to said steam condenser means, said vacuum pump means for causing a vacuum within said condenser means and said evaporator means;

a pulverizing drier means mounted on said chassis, said pulverizing drier means receiving a concentrated liquid substance from said evaporator means, said pulverizing drier means for converting at least a portion of the concentrated liquid substance into a solid powder;

air-heater means mounted on said chassis, said air-heater means connected to said evaporator means and to said pulverizing drier means for supplying heat to said evaporator means, said air-heater means for supplying heated air to said pulverizing drier means; and separator-filter means connected to said pulverizing drier means, said separator-filter means for drawing out hot humid air and filtering and recovering dust particles, said separator-filter means mounted on said chassis;

to hot-air separator mounted on said chassis and connected to said pulverizing-driver means, said air-heater means connected to said hot-air separator; and a single engine connected in driving relationship to said evaporator means, to said steam condenser means, to said vacuum-pump means, to said pulverizing drier means, to said air-heater means, to said separator-filter means, and to said hot-air separator.

2. The mobile industrial plant of claim 1, said pulverizing drier means having a spinning rotor for pulverization, said pulverizing drier means having a central drying agent distributor and a peripheral drying agent distributor, said central and peripheral drying agent distributors for drying and suspending a fractionated liquid.

3. The mobile industrial plant of claim 1, said pulverizing drier means further comprising;

a rotative valve positioned at a bottom of a pulverizing drier cylinder, said rotative valve connected to a vertical turbulence cylinder below for conveying and suspending the solid powder from said pulverizing drier cylinder.

4. The mobile industrial plant of claim 1, said hot-air separator means comprising:

a centrifugal separator means communicating with said pulverizing drier means, said centrifugal separator means driven by hot pneumatic air from said air-heater means, said centrifugal separator means for separating solid particles from hot flowing air.

5. The mobile industrial plant of claim 1, means for receiving liquids comprising:

said container positioned on said chassis adjacent said evaporator means, said container in valved communication with said evaporator means.

6. The mobile industrial plant of claim 1, said air-heater means comprising a gasoline-fueled burner having two separate air intakes thereon, one of said intakes being for combustion, the other of said intakes being for hot air flow.

7. The mobile industrial plant of claim 6, said air-heater means having a first heating hot air line extending from said burner to said evaporator means, said first line passing exhaust gasses resulting from combustion, said first line for heating liquid substances in said evaporator by means of a radiator, said air-heater means having a second heating hot-air line passing clean hot air and connected to said pulverizer drier, said air heater means having a third heating hot-air line passing clean hot air and connected to said hot-air separator means.

8. The mobile industrial plant of claim 7, said evaporator means having a float contained therein, said float interactive with a valve interconnected to said container, said float for actuating said valve so as to allow the liquid to move from said container to said evaporator means and to allow liquid to move from said evaporator means to said pulverizing-drier means, said float for maintaining a constant level of liquid within said evaporator means, said float for controlling an inflow and an outflow of concentrated liquids.

9. The mobile industrial plant of claim 1 further comprising:

a dried powder accumulator connected to said separator-filter means, said accumulator for receiving the separated powder from said separator-filter means.

10. The mobile industrial plant of claim 1, said steam condenser means being mounted to a top surface of said evaporator means.

11. The mobile industrial plant of claim 1, further comprising:

a centrifugal separator means communicating with said pulverizing-drier means, said centrifugal separator means driven by hot pneumatic air from said air-heater means, said centrifugal separator means for separating solid particles from hot flowing air.

12. The mobile industrial plant of claim 1, said hot-air separator connected to a cold-air separator means mounted on said chassis, said cold-air separator means for providing cooling action to surface liquids having dust particles therein.

13. The mobile industrial plant of claim 1, further comprising:

two gasoline tanks and a liquid storage tank affixed at an underside of said chassis, one of said gasoline tanks connected to said air-heater means, another of said gasoline tanks connected to said engine.

* * * * *